Jan. 26, 1937.　　　　　S. J. DUNAWAY　　　　　2,069,179
VAPOR DISSEMINATING PACKAGE
Filed Nov. 25, 1935
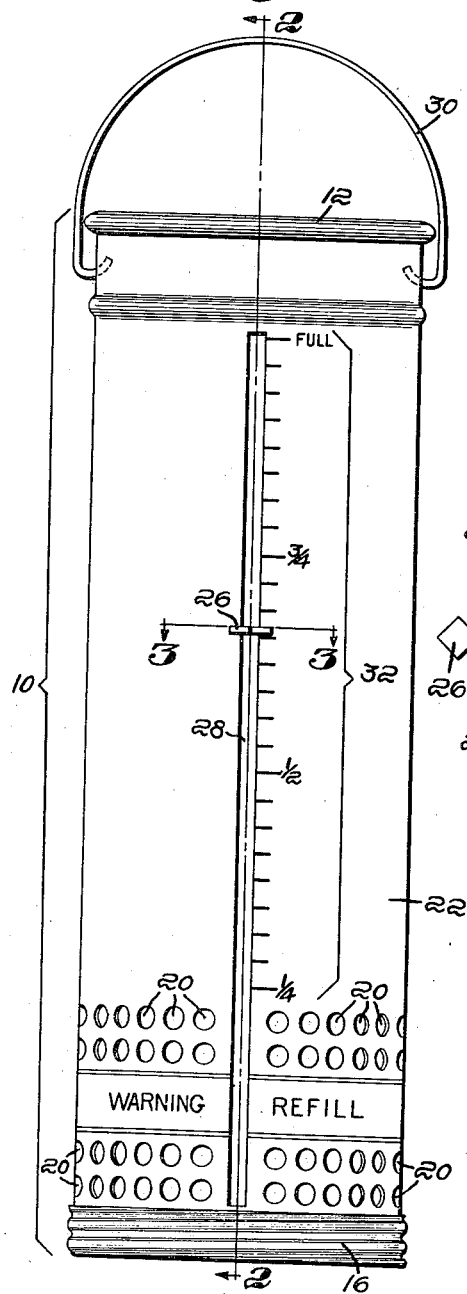
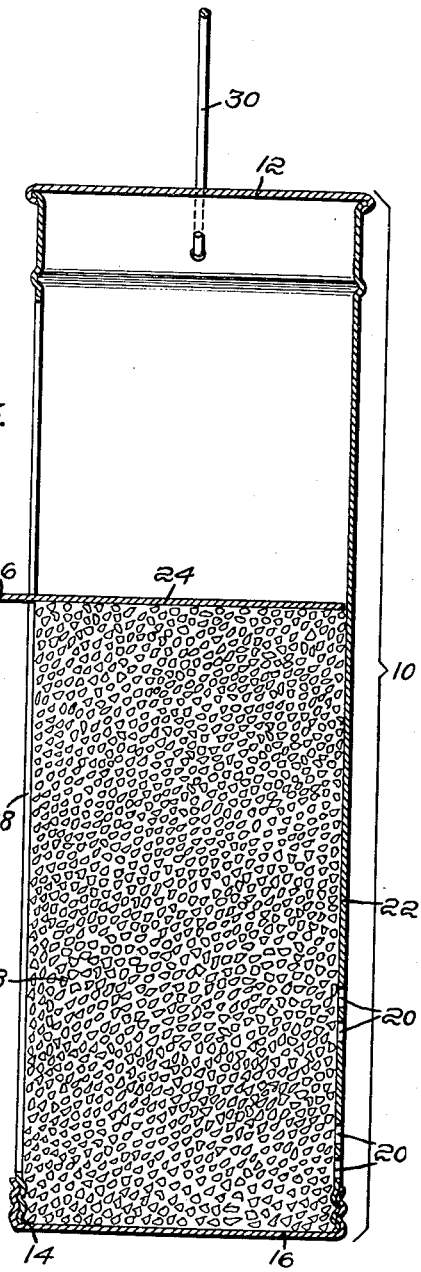
Inventor:
Sanford J. Dunaway, Patented Jan. 26, 1937

2,069,179

UNITED STATES PATENT OFFICE 2,069,179

VAPOR DISSEMINATING PACKAGE

Sanford Judson Dunaway, Dover, N. H., assignor to The Expello Corporation, Dover, N. H., a corporation of New Hampshire Application November 25, 1935, Serial No. 51,358

5 Claims. (Cl. 299—24)

This invention relates to a novel vapor disseminating package comprising for an evaporable substance such as paradichlorobenzene, and is intended to be hung in a closet where the vapor from said substance will kill moths and moth larvae. The invention will best be understood by reference to the following description when taken in connection with the accompanying drawing of one specific embodiment thereof, while its scope will be pointed out more particularly in the appended claims.

In the drawing:

Fig. 1 is an elevation of a receptacle embodying the invention;

Fig. 2 is a sectional view on line 2—2 of Fig. 1; and

Fig. 3 is a sectional view on line 3—3 of Fig. 1.

Referring to the drawing and to the embodiment of the invention illustrated therein by way of example, there is shown a vapor disseminating package, a receptacle in the form of a container 10 comprising a body 12 having a filling opening 14 and a cover 16 for said opening. In this example, the cover is threaded onto the body and is conveniently removable for the filling and refilling of the container with an evaporable substance 18 such as paradichlorobenzene which is usually in the form of crystals. The container is provided with one or more, herein a plurality of, perforations 20 for the escape of the vapor, these perforations, in the present embodiment, being in a lateral wall 22 of the body 12.

A follower 24 resting on the evaporable substance serves to show the amount of the substance within the container. In the example shown, the follower is provided with a projection such as a pointer 26 which projects through a slot 28 which extends lengthwise of the travel of the follower, in the wall 22, although the pointer and the slot are not necessary if the wall 22 is made of transparent material. However, I prefer to make the container of thin metal. I prefer to provide the projecting pointer, as shown, but if the pointer is eliminated, the follower can be seen through the slot.

In the present example, the follower is on the top of the evaporable substance and gravitation alone is relied upon to cause it to follow the substance as the latter evaporates. This avoids the need of a spring to move the follower and the substance. In this case, the perforations 20 and the filling opening 14 are below the follower 24. When the substance is to be replenished, the receptacle is inverted, the follower gravitates toward the closed end of the receptacle, and when the cover is removed, the receptatcle can be filled and the cover replaced, after which the receptacle is placed right side up. In this example, the receptacle is provided with attaching means such as a bail 30 by means of which it may be hung on a suitable support such as a hook in a closet.

As shown, the pointer 26 cooperates with a graduated scale 32 having appropriate markings herein including indications reading "Full", "¾", "⅓" and "¼", and there is also a legend, "Warning refill" below the "¼" mark. Each time a person goes to the closet to remove or to replace a garment, his eye naturally falls on the indicator and he can see how much of the evaporable substance remains and will be warned to refill the container when the supply is low.

Having thus described one embodiment of the invention but without limiting myself thereto, what I claim, and desire, by Letters Patent, to secure is:

1. A vapor disseminating package comprising, in combination, a container having a perforate wall for the escape of vapor from the interior to the exterior, said container being provided with an opening at the bottom for the filling and refilling of said container, a closure for said opening, an evaporable substance supported by said closure, a follower supported by said substance and arranged to follow the latter toward said closure as said substance evaporates, and indicating means visible from the outside to indicate the position of said follower.

2. A vapor disseminating package comprising, in combination, a container having a perforate wall for the escape of vapor from the interior to the exterior, said wall being provided with a vertically extending slot, said container being provided with an opening at the bottom for the filling and refilling of said container, a closure for said opening, an evaporable substance supported by said closure, a follower supported by said substance and arranged to follow the latter toward said closure as said substance evaporates, and a projection extending from said follower through said slot to the exterior where it will indicate the position of said follower.

3. A vapor disseminating package comprising, in combination, a container having a perforate wall for the escape of vapor from the interior to the exterior, said wall being provided with a vertically extending slot, said container being provided with an opening at the bottom for the filling and refilling of said container, a closure for said opening, an evaporable substance supported by said closure, a follower supported by said substance and arranged to follow the latter toward said closure as said substance evaporates, a projection extending from said follower through said slot to the exterior, and means cooperating with said pointer to indicate the amount of the substance in said container.

4. A vapor disseminating package comprising, in combination, a container comprising a body having a filling opening at the bottom, an evaporable substance within said body, a cover across said opening and supporting said substance, said container being perforate to permit the escape of vapor from said substance, and a gravitational follower and indicator resting upon said substance and following the latter toward said cover as said substance evaporates, and indicating at the exterior of said container the amount of said substance in said container.

5. A vapor disseminating package comprising, in combination, a container comprising a body having a filling opening at the bottom, an evaporable substance within said body, a cover across said opening and supporting said substance, said container being perforate to permit the escape of vapor from said substance, means adjacent the top of said container to attach the latter to a support, and a gravitational follower and indicator resting upon said substance and following the latter toward said cover as the substance evaporates, and indicating at the exterior of said container the amount of said substance in said container.

SANFORD JUDSON DUNAWAY.